UNITED STATES PATENT OFFICE 2,340,779

MANUFACTURE OF PAVING COMPOSITIONS

Adrian B. Talbot, Darien, Conn., assignor to Colprovia Roads, Inc., Rochester, N. Y., a corporation of New York No Drawing. Application December 28, 1940, Serial No. 372,181

9 Claims. (Cl. 106—280)

This invention relates to paving compositions employing bituminous material as a binder for aggregate particles. More particularly it relates to the manufacture of pavements and paving compositions which remain friable after mixing even though the temperature of the composition is below the temperature at which the bituminous binder in the ultimate pavement is quite stiff and which after mixing can therefore be transported to the point of use and laid without requiring application of heat to keep the composition in a workable condition.

More specifically this invention relates to improvements in process of preparing paving compositions wherein a bituminous binder part of relatively low stability such as a substantially non-volatile flux oil is used in conjunction with a bituminous binder part of relatively high stability such as a powdered bitumen that is adapted to gradually amalgamate with the bituminous binder of low stability to form an amalgamated binder of intermediate stability for aggregate particles to which the binder parts are applied.

One method of preparing a paving composition utilizing a non-volatile flux oil and powdered bitumen, that has been extensively used, comprises coating the aggregate particles with the non-volatile flux oil and subsequently adding powdered asphalt or other powdered bitumen. The aggregate usually is first coated with the flux oil by mixing these materials together and the powdered asphalt is then incorporated, the mixing being continued only for a sufficient time to distribute the powdered asphalt, which adheres to the flux coated aggregate particles as a dust, throughout the mixture. The paving composition as thus prepared remains workable while the mass is relatively cool due to the fact that the flux oil and powdered asphalt do not amalgamate while in the mixer sufficiently to render the mass unworkable. After the composition has been prepared as above described it can be consolidated in place and upon consolidation the powdered asphalt and the flux oil will gradually amalgamate to afford a binder of desired stability for the aggregate. This method while satisfactory for many purposes has certain disadvantages and limitations. One of these disadvantages resides in the fact that the aggregate is not coated with sufficient binder for many types of paving compositions. Thus on certain types of stone the flux oil adheres only as a very thin film to which the powdered asphalt will not adhere in sufficient quantities to form a stable binder for the aggregate. Moreover, when graded aggregates are used the flux tends to become excessively adherent to the finer portions of the aggregate to form a mortar-like mass between the larger aggregate particles which carry insufficient binder and tend to pull out under traffic.

It has been proposed heretofore to modify the process above described by first mixing together the flux oil and powdered bitumen to form a paste-like mass in which the flux oil and powdered bitumen may be partially amalgamated and thereafter apply the paste-like mass to the aggregate particles. While this modification enables one to coat the aggregate with a heavy bituminous coating the difficulties incident to this process have been so great that it has not gone into commercial use to any substantial extent. In carrying out the process a special mixing apparatus is required to mix the flux oil and powdered bitumen. This adds to the cost of the paving plant and requires a separate mixing operation that adds materially to the time and expense for preparing the paving composition. Moreover, when graded aggregates are used the preformed paste of mixed flux oil and powdered bitumen does not become satisfactorily distributed between the coarse and the fine aggregate particles and the process is difficult to control.

According to the present invention the difficulties incident to the prior processes above referred to are overcome by utilizing a portion of the aggregate for commingling the flux oil and powdered bitumen into a paste. In this manner the flux oil and powdered bitumen may be mixed in the same mixer that is used in preparing the coated aggregate. By utilizing a portion of the aggregate the flux oil and powdered bitumen instead of merely adhering to the walls and blades of the mixer without mixing action, are carried by the portion of aggregate that is used as a vehicle for mixing the flux oil and powdered bitumen. In such case the mixer blades act on the aggregate portion in the mixer and this aggregate portion in turn acts on the flux oil and powdered bitumen to thoroughly commingle these materials into a paste that is carried on the aggregate portion. After the flux oil and powdered bitumen have been thoroughly commingled into a paste carried by the aggregate portion, the balance of the aggregate may be added and mixing may be continued until the balance of the aggregate becomes coated with the paste of commingled flux oil and powdered bitumen.

In carrying out this invention it is necessary that the aggregate portion which is used as an agency for commingling the flux oil and powdered bitumen have a relatively low superficial area in relation to the superficial area of the total aggregate so that the flux oil, instead of being carried as a thin film on a large superficial area is carried in excess and in a condition for becoming commingled with the powdered bitumen so that a paste of commingled flux oil and powdered bitumen may be readily formed. For this reason it is desirable that the portion of the aggregate used as an agent for commingling the flux oil and powdered bitumen have a superficial area that is less than half the superficial area of the total amount of aggregate used in the ultimate paving composition. Preferably the superficial area of the aggregate that is used for the purpose of preliminarily commingling the flux oil and powdered bitumen is about 1% to about 30% of the superficial area of the total aggregate. In usual practice it has been found to be especially desirable if the mixing of the flux oil and powdered bitumen is carried on in the presence of a portion of the aggregate having about 3% to about 15% of the superficial area of the total aggregate.

Unless all of the aggregate particles are of approximately the same size, it does not follow that the weight or bulk of the portion of aggregate used for commingling the flux oil and powdered bitumen is in direct proportion to the superficial area inasmuch as for a given weight the relatively fine aggregate particles have a greater superficial area than the relatively coarse aggregate particles. When the aggregate particles are of varying size it is distinctly preferable to use the coarser aggregate particles as the agency for commingling the flux oil and powdered bitumen, namely to utilize a portion of the aggregate in which the ratio of superficial area to weight or bulk is low. In this manner a relatively low superficial area favoring commingling of the flux oil and powdered bitumen is afforded and at the same time sufficient bulk is afforded to give mechanical mixing action on the flux oil and powdered bitumen. Moreover, it is much more difficult to properly coat the coarser aggregate particles than it is to coat the finer aggregate particles and by utilizing the coarser particles as a medium for mixing the flux oil and powdered bitumen these particles become very thoroughly coated with the pasty mass of commingled flux oil and powdered bitumen and improper coating of the coarser aggregate particles is avoided.

While keeping low the superficial area of the aggregate portions used in commingling the flux oil and powdered bitumen, the amount of aggregate should be sufficient to provide a good mechanical mixing action on the flux oil and powdered bitumen and to this end the weight of the aggregate should be at least equal to the combined weight of the flux oil and powdered bitumen with which it is mixed and preferably should be at least twice the weight of the combined weight of the flux oil and powdered bitumen. Ordinary "asphalt sand" usually contains particles 30% by weight of which passes a 10 mesh testing sieve and is retained on a 40 mesh sieve, 45% by weight of which passes a 40 mesh sieve and is retained on an 80 mesh sieve and 25% by weight of which passes an 80 mesh sieve and is retained on a 200 mesh sieve. Such a material has a calculated theoretical superficial area of 90 square centimeters per gram of the aggregate and represents about as fine material as it is desirable to employ as the medium for effecting a commingling of the flux oil and powdered bitumen. While such a material may be used when substantially all of the aggregate is of equal fineness of subdivision, e. g. in the manufacture of "sheet" paving layers, it is distinctly preferable to employ aggregate which has a superficial area in square centimeters per gram which is considerably lower, e. g. around 25 and even down to about 4 for stone of ¼ inch size of 2.5 or less for stone over ½ inch or larger. Moreover when the aggregate is composed of stone of about ¼ inch or larger in size together with asphalt sand (with or without filler) it is in accordance with the preferred practice of this invention to utilize all or a portion of the stone as the agent for commingling the flux oil and powdered bitumen and to add the balance of the aggregate comprising the finer particles after the flux oil and powdered bitumen have been thoroughly commingled in the presence of the stone. Somewhat more generally when graded aggregate is employed the superficial area in centimeters per gram of the portion of the aggregate used to assist in commingling the flux oil and powdered bitumen is preferably less than that of the balance of the aggregate subsequently added. Thus the superficial area in square centimeters per gram of the aggregate used to commingle the flux oil and powdered bitumen may be less than 25, e. g. around 4, while as to the balance of the aggregate that is subsequently added it may be greater than 25, e. g. around 90 in the case of asphalt sand or the like or even higher when filler is also present.

In practicing this invention commercially one usually employs an amount of aggregate which occupies about 20% to about 40% by bulk of the capacity of the mixer that is used although considerable variation is permitted i. e. within approximately 10% to approximately 75% of the capacity of the mixer. When the portion of the aggregate that is used for commingling the flux oil and powedered bitumen approaches as high as 75% by bulk of the capacity of the mixer it necessarily follows that the particles of this portion of the aggregate are relatively coarse so that the superficial area of this portion of the aggregate may remain low as indicated hereinabove.

In order to afford a better understanding of the practice of this invention, it may be illustrated in connection with the following example. The paving composition to be prepared consists of about 50% by weight of coarse aggregate (about ¼ inch stone) about 35% by weight of asphalt sand of the character above mentioned, about 7% by weight of filler (passing a 200 mesh sieve), about 4.8% by weight of flux oil having a viscosity furol at 122° F. or about 800, and about 3.2% by weight of powdered bitumen of about 1 penetration adapted to gradually amalgamate with the flux oil without the application of heat when the paving composition is consolidated in place as a paving layer. The mixing operation is carried on as follows. The above mentioned ingredients are measured out in amounts adapted to fill substantially to its capacity the mixer that is used. Of the coarse aggregate sufficient is first introduced into the mixer to occupy about 40% of the capacity of the mixer, this amount being about ⅘ of the total coarse aggregate. This portion of the aggregate introduced into the mixer may have for example about 3% of the superficial area of the total amount of the aggregate used in the batch. The flux oil and powdered asphalt are then introduced into the mixer in any sequence although it is usually preferable to add the flux oil first to the aggregate in the mixer. The flux oil may be at a temperature of about 125° F. and the powdered bitumen may be at normal atmospheric temperatures. The aggregate may be at normal atmospheric temperature or slightly above. The mixer is then operated to mix the materials together. During mixing the aggregate particles tumble about in the mixer picking up the flux oil and powdered asphalt which become rapidly worked together due to the mechanical action of the agitated aggregated particles and form an intimately commingled paste-like coating on the aggregate particles which coating is greatly in excess of that which it is desired to have as a coating for the particles in the completed paving composition. When the mass has taken on the appearance of aggregate particles carrying a heavy coating of paste the balance of the aggregate is incorporated and the mixing is continued. It has been found that the particles of the subsequently added aggregate rapidly become coated with the paste and when the coating of all of the particles has been completed the paving composition is discharged from the mixer while the flux oil and powedered bitumen are still insufficiently amalgamated to cause the mass to set up and become excessively stiff and unworkable while in the mixer.

The paving composition produced as above described comprises aggregate particles which are very uniformly coated with a paste of the flux oil and powdered bitumen. By virtue of the sequence of operations the flux oil is prevented from becoming taken up primarily by the finer particles and non-uniform commingling of flux oil and powdered bitumen throughout the mass is prevented. Moreover the coarser particles become thoroughly coated with the paste and do not remain excessively dry and insufficiently coated with the binder. In addition the operation can be carried out with standard paving plant equipment quickly and without increased cost as compared with less desirable paving methods heretofore practiced. Moreover by carrying out the operation as above described a paving composition can be produced which has high initial stability on the road and in which any desired amount of binder can be incorporated with a high degree of uniformity throughout.

While this invention has been illustrated in connection with a specific example it is apparent that the practice of this invention may be varied within the principles hereinabove described. Thus instead of using a graded aggregate an aggregate consisting substantially entirely of particles of approximately the same size may be used and in such case the superficial area of the portion used to assist in the commingling of the flux oil and powdered asphalt is on the order hereinabove defined. However, this invention is of particular utility in coating graded aggregates, the coarser portion being utilized to assist in commingling the flux oil and powdered bitumen as a paste which is transferred in part to the finer portion subsequently added, it being much easier to transfer the excess coating of paste from the coarse to the fine particles rather than from the fine to the coarse particles. It is usually preferable that at least about 25% by weight of the total aggregate be in the form of particles ¼ inch or more in thickness.

The mixing usually is carried out at normal temperatures or slightly above. If the flux oil is relatively stiff and flows very slowly at normal temperatures it may be warmed somewhat so that it will coat the aggregate more quickly. The flux oil may for example be heated to about 250° F. although this is not necessary in normal practice. The aggregate may likewise be used when quite warm. The mixing should preferably take place while the mass is below about 200° F. and preferably while below about 175° F. to avoid excessively rapid amalgamation of the flux oil and powdered bitumen. When the mixing takes place while warm the setup of the composition after discharge from the mixture is generally more rapid.

One of the advantages of this invention resides in the control that is possible in practicing the invention. It has been mentioned that the temperature at which the operation is carried on affects the rapidity of the setup of the composition. The duration of mixing also affects the characteristics of the resulting composition. Thus longer mixing of the flux oil and powdered bitumen results in a stiffer mix that sets up relatively quickly while shorter mixing time results in a composition that is softer and has better storing properties. Moreover, by controlling the duration of mixing before the balance of the aggregate is added, the paste of intimately commingled flux oil and powdered bitumen can be brought to the desired consistency for coating the balance of the aggregate. During the mixing the flux oil and powdered bitumen enter into some preliminary amalgamation but this is only sufficient to achieve the desired consistency of the pasty coating for the aggregate particles and in the resulting composition. After the completion of the mixing steps the flux oil and powdered bitumen are still incompletely amalgamated so that the mass remains workable and can be spread as a layer on the road foundation. After the composition has been consolidated in place the amalgamation continues and the mass sets up to afford a pavement of desired stability. When reference is made to a bitumen that will amalgamate with the flux oil used, the amalgamation may take place either unassisted or assisted as by the application of pressure by a roller or traffic.

The types and amounts of bituminous components which may be used in the practice of this invention may be that which has been usually employed in prior road making methods. Thus the powdered bitumen may be an asphalt having a penetration of about 0 to 8 at 77° F. (100 grams and 5 seconds). The flux oil is preferably a bituminous oil having a viscosity of about 300 to 1200 seconds furol at 122° F. although the choice of flux oil is one of considerable latitude and fluxes having a viscosity of about 100 seconds furol at 122° F. to 1000 seconds furol at 180° F. also may be used.

Usually the amounts of flux oil and powdered bitumen that are used range from about equal proportions to approximately 65 parts of flux oil to 35 parts of powdered bitumen although there is considerable latitude in this regard.

Bituminous materials derived from the refining of crude petroleum are preferably employed although other bitumens may be used such as naturally occurring asphaltic materials, pitches, tars and the like.

Usually in the practice of this invention all of the flux and powdered bitumen are commingled in the presence of a portion of the aggregate as hereinabove described. It is possible, however, to add some of the bitumen after this initial mixing and commingling step. In any event the amount of flux oil and bitumen in the portion of aggregate utilized to commingle these binder parts should be considerably in excess of the proportion of binder to aggregate required for the finished pavement. In order to provide a desired excess of binder when the average size of the aggregate present during the initial mixing and commingling step is relatively coarse, e. g., relatively large stone aggregate having superficial area of about 2½ square centimeters per gram, the total amount of binder material present in the mixture during this step should be at about 5% by weight of the mixture, and for relatively fine aggregate, e. g., sand having a superficial area of about 90 square centimeters per gram, should be at least about 15% by weight of the mixture. In preferred practice, the amount of binder material present during the initial mixing and commingling step should be about 10% to about 20% by weight of the mixture for the relatively coarse aggregate and should be about 20% to about 35% by weight of the mixture for the relatively fine aggregate. It is desirable also that the amount of binder material not exceed about 45% by weight of the mixture in the case of the relatively coarse aggregate and should not exceed about 55% by weight of the mixture in the case of the relatively fine aggregate. For aggregate of intermediate sizes and superficial areas, the desired minimum, maximum and preferred amounts of binder material in the mixture during the initial mixing and commingling should be varied approximately proportionally between the amounts mentioned above. While the flux oil and powdered bitumen may be the sole bituminous binder that is present a third bituminous binder material may be used such for example as a standard grade of paving asphalt which is incorporated in a heat liquefied condition, or thinned with a volatile cut back, or emulsified in water. If some additional bituminous binder material is used it is preferably intermediate in stability between the flux oil and powdered bitumen, e. g. an asphalt cement of about 50 to 150 penetration. Especially when the third bitumen is in the form of an asphalt cement added in a heat liquefied condition the rapidity of the set-up of the resulting paving composition is increased, a result which, in some cases is desirable especially when the resulting pavement is to be thrown open to heavy traffic immediately after laying. Any such third bituminous binder is normally used in minor proportions however. The binder in a completed pavement resulting from ultimate amalgamation of the flux oil and powdered bitumen with or without other bituminous materials may be varied as desired, the most common practice being to provide a bituminous binder having a penetration of about 50 to about 150. Usually the process is carried out in the absence of any substantial quantity of volatile solvent material in addition to the non-volatile flux oil and powdered bitumen, but some volatile solvent material in addition to the non-volatile flux oil and powdered bitumen may be used in the practice of this invention, for example, in cold weather.

The mixing may be carried on in any suitable type of mixer or may even be carried on by hand or in situ by means of drags, bladers or the like. The conventional pug-mill type of mixer used in most bituminous paving plants is, however, typical of mixing apparatus which may be very advantageously used according to this invention in the preferred practice thereof.

The practice of this invention may be varied within the scope of this invention as defined by the following claims.

I claim:

1. In a process of making a paving composition wherein aggregate material is coated in a mechanical mixer with a substantially non-volatile flux oil and powdered bitumen adapted to gradually amalgamate with the flux oil without the application of heat, the steps comprising introducing flux oil and powdered bitumen into the mixer together with a portion of the aggregate the superficial area of which portion is less than about 90 square centimeters per gram and is not more than about 30% of the superficial area of the total aggregate and which portion occupies at least about 10% of the total capacity of the mixer, subjecting said aggregate, flux oil and powdered bitumen to mechanical mixing in the mixer until the flux oil and powdered bitumen become intimately commingled and partially amalgamated as a paste coating the aggregate particles in an amount that is substantially in excess of the proportion of bituminous binder desired in the finished composition, then introducing the balance of the aggregate into the mixer, continuing the mixing until the balance of the aggregate becomes coated with the paste of partially amalgamated commingled flux oil and powdered bitumen, and discharging the coated aggregate from the mixer before the flux oil and powdered bitumen become amalgamated sufficiently to cause the mass to become unworkable in the mixer.

2. In a process of making a paving composition wherein aggregate material is coated in a mechanical mixer with a substantially non-volatile flux oil and a powdered bituminous binder adapted to gradually amalgamate with the flux oil without the application of heat, the steps comprising introducing into the mixer flux oil and powdered bitumen together with a portion of the aggregate that occupies about 10% to about 75% of the capacity of the mixer, that has a superficial area which is not more than about 25 square centimeters per gram and which is about 1% to about 30% of the superficial area of the total aggregate and that has a substantially lower ratio of superficial area to weight than the blance of the aggregate, subjecting said aggregate flux oil and powdered bitumen to mechanical mixing in the mixer until the flux oil and powdered bitumen become intimately commingled and partially amalgamated as a paste coating the aggregate particles in an amount in excess of the proportion of bituminous binder desired in the finished composition, then introducing the balance of the aggregate into the mixer, continuing the mixing until the balance of the aggregate becomes coated with the commingled paste of partially amalgamated flux oil and powdered bitumen, and discharging the coated aggregate from the mixer before the flux oil and powdered bitumen become amalgamated sufficiently to cause the mass to become unworkable in the mixer.

3. In a process of making a paving composition wherein aggregate material comprising particles of different sizes is coated in a mechanical mixer with substantially non-volatile flux oil and a powdered bitumen adapted to gradually amalgamate with the flux oil without the application of heat, the steps comprising introducing into the mixer a portion of the aggregate that occupies about 10% to about 75% of the capacity of the mixer and that has less than 30% of the superficial area of the total aggregate and has a superficial area of less than about 25 square centimeters per gram, subjecting the aggregate, flux oil and powdered bitumen to mechanical mixing in the mixer until the flux oil and powdered bitumen become intimately commingled and partially amalgamated as a paste coating the aggregate particles in an amount in excess of the proportion of bituminous binder desired in the finished composition, then introducing the balance of the aggregate which balance of the aggregate has a superficial area substantially greater than 25 square centimeters per gram, continuing the mixing until the balance of the aggregate becomes coated with the paste of partially amalgamated commingled flux oil and powdered bitumen, and discharging the coated aggregate from the mixer before the flux oil and powdered bitumen amalgamate sufficiently to cause the mass to become unworkable in the mixer.

4. In a process of making a paving composition wherein aggregate material is coated in a mechanical mixer with a substantially non-volatile flux oil and a powdered bitumen adapted to gradually amalgamate with the flux oil without the application of heat, the steps introducing into the mixer a portion of the aggregate that occupies about 20% to about 40% of the capacity of the mixer and that has about 3% to about 15% of the superficial area of the total aggregate together with flux oil and powdered bitumen, subjecting said aggregate, flux oil and powdered bitumen to mixing until the said flux oil and powdered bitumen become commingled and partially amalgamated as a heavy paste and until the aggregate particles in the mixer become coated with the said paste of commingled and partially amalgamated flux oil and powdered bitumen in excess of the proportion of bituminous binder for the aggregate desired in the finished pavement, then introducing the balance of the aggregate, continuing the mixing until all of the aggregate particles become coated with the commingled flux oil and powdered bitumen, and discharging the coated aggregate from the mixer before the flux oil and powdered bitumen become amalgamated sufficiently to cause the mass to become unworkable in the mixer.

5. In a process of making a paving composition wherein aggregate material is coated with a substantially non-volatile flux oil and powdered bitumen adapted to gradually amalgamate with the flux oil without the application of heat, the steps comprising mixing the flux oil and powdered bitumen together while commingled with a first portion of the aggregate which has a substantially higher ratio of bulk to area of surface than the balance of the aggregate, which has less than 30% the area of surface of the total aggregate, which has a surface area in square centimeters per gram less than about 25, and which is at least about equal in weight to the combined weight of the flux oil and powdered bitumen thereby promoting the thorough commingling of the flux oil and powdered bitumen and causing said flux oil and powdered bitumen to partially amalgamate and form a bituminous paste and at the same time thoroughly coating the particles of said first portion of the aggregate with an amount of said commingled flux oil and powdered bitumen that is in excess of that required for said aggregate particles of said first portion, and thereafter incorporating the balance of the aggregate and continuing the mixing until the particles of said balance of the aggregate become coated with said commingled flux oil and powdered bitumen, said flux oil and powdered bitumen not being completely amalgamated with each other during said mixing steps.

6. In a process of making a paving composition wherein aggregate material is coated with a substantially non-volatile flux oil and powdered bitumen adapted to gradually amalgamate with the flux oil without the application of heat, the steps comprising mixing the flux oil and powdered bitumen together while commingled with a portion of the aggregate which is at least twice as great by weight as the weight of the combined flux oil and powdered bitumen, which has a superficial area not greater than about 90 square centimeters per gram and which has a superficial area not greater than about 30% of the superficial area of the total aggregate thereby promoting the thorough commingling of the flux oil and powdered bitumen and at the same time thoroughly coating the particles of said portion of the aggregate and causing said flux oil and powdered bitumen to partially amalgamate and form a bituminous paste, and thereafter incorporating the balance of the aggregate which has a superficial area of at least about 90 square centimeters per gram and continuing the mixing until the particles of said balance of the aggregate become coated with said paste of flux oil and powdered bitumen, said flux oil and powdered bitumen not becoming substantially completely amalgamated during the mixing steps.

7. In a process of making a paving composition wherein aggregate material comprising at least 25% of stone at least ¼ inch in thickness together with finer material is coated with a substantially non-volatile flux oil and powdered bitumen adapted to gradually amalgamate with the flux oil without the application of heat, the steps comprising mixing the flux oil and powdered bitumen together while commingled with an amount of the coarser aggregate material that is at least twice as great by weight as the combined weight of the flux oil and powdered bitumen and that has less than 30% of the superficial area of the total aggregate thereby promoting the commingling of the flux oil and powdered bitumen and causing said flux oil and powdered bitumen to partially amalgamate and form a bituminous paste and at the same time coating the the particles of said portion of the aggregate with the commingled flux oil and powdered bitumen as a bituminous paste in excess of the proportion of bituminous binder desired in the finished composition, thereafter incorporating the balance of the aggregate and continuing the mixing until all the aggregate particles become coated with the commingled flux oil and powdered bitumen, said flux oil and powdered bitumen not becoming substantially completely amalgamated during the mixing steps.

8. In a process of making paving composition wherein aggregate material is coated with bituminous binding materials comprising substantially non-volatile flux oil and powdered bitumen adapted to gradually amalgamate with the flux oil without the application of heat, the steps comprising mixing aggregate having an average superficial area ranging from about 2.5 square centimeters per gram to about 90 square centimeters per gram with an amount of said bituminous materials constituting about 5% to about 45% by weight of the resulting mixture in the case of aggregate having an average superficial area of about 2.5 square centimeters per gram, about 15% to about 55% by weight of the resulting mixture in the case of aggregate having an average superficial area of about 90 square centimeters per gram and approximately proportional amounts of the binder materials in the case of aggregates of average intermediate sizes, thereby commingling the flux oil and powdered bitumen and causing them to partially amalgamate and form a bituminous paste and at the same time coating the aggregate particles with the commingled flux oil and powdered bitumen in the form of said bituminous paste in an amount that is in excess of the proportion of bituminous binder desired in the finished composition, thereafter incorporating additional aggregate the superficial area of which is substantially greater than the superficial area of the said aggregate previously coated with said paste and continuing the mixing until all the aggregate particles become coated with the said paste of commingled and partially amalgamated flux oil and powdered bitumen, said flux oil and powdered bitumen not being substantially completely amalgamated during the mixing steps.

9. The steps in a process of making a paving composition according to claim 8 wherein during the initial mixing step the aggregate has an average superficial area ranging from about 2.5 square centimeters per gram to about 90 square centimeters per gram and the amount of bituminous materials mixed therewith is about 10% to about 20% by weight of the mixture in the case of aggregate having an average superficial area of about 2.5 square centimeters per gram, is about 20% to about 35% by weight of the mixture in the case of aggregate having an average superficial area of 90 square centimeters per gram, and is approximately proportional to the foregoing in the case of aggregates having intermediate average superficial areas.

ADRIAN B. TALBOT.

CERTIFICATE OF CORRECTION.

Patent No. 2,340,779. February 1, 1944.

ADRIAN B. TALBOT.

It is hereby certified that error appears in the printed specification of the above numbered patent requiring correction as follows: Page 2, second column, line 45, for "powedered" read --powdered--; and line 60, for "or about" read --of about--; page 5, first column, line 62, after "30%" insert --of--; and that the said Letters Patent should be read with this correction therein that the same may conform to the record of the case in the Patent Office.

Signed and sealed this 18th day of April, A. D. 1944.

Leslie Frazer (Seal) Acting Commissioner of Patents.